US012737350B2

(12) United States Patent
Fast et al.

(10) Patent No.: US 12,737,350 B2
(45) **Date of Patent: *Sep. 15, 2026**

(54) METRICS AND EVENTS INFRASTRUCTURE

(71) Applicant: 128 Technology, Inc., Burlington, MA (US)

(72) Inventors: Gregory Fast, Cambridge, MA (US); Greg Schrock, Billerica, MA (US); Dillon Buchanan, Waltham, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/927,695

(22) Filed: Oct. 25, 2024

(65) Prior Publication Data

US 2025/0117377 A1 Apr. 10, 2025

Related U.S. Application Data

(63) Continuation of application No. 18/473,772, filed on Sep. 25, 2023, now Pat. No. 12,164,509, which is a (Continued)

(51) Int. Cl.
*G06F 16/23* (2019.01)
*G06F 16/2458* (2019.01)
(Continued)

(52) U.S. Cl.
CPC ...... *G06F 16/2379* (2019.01); *G06F 16/2474* (2019.01); *H04L 41/069* (2013.01); (Continued)

(58) Field of Classification Search
CPC ............. G06F 16/2379; G06F 16/2474; H04L 41/069; H04L 45/44; H04L 67/1095; H04L 45/56
See application file for complete search history.

(56) References Cited

U.S. PATENT DOCUMENTS 9,311,479 B1 4/2016 Manni et al.
10,002,141 B2 * 6/2018 Jalan .................. H04L 67/1095
(Continued)

FOREIGN PATENT DOCUMENTS

CN 103984694 A 8/2014
CN 105683929 A 6/2016

OTHER PUBLICATIONS

Banks, "Packet Walking Through A 128 Technology Network," 128 Technology, Retrieved Feb. 15, 2021 from: https://www.128technology.com/resources/resources-sd-wan/128-technology-raises-30-million-series-d-financing-2/, Sep. 19, 2019, 14 pp.
(Continued)

*Primary Examiner* — Tarek Chbouki
(74) *Attorney, Agent, or Firm* — Shumaker & Sieffert P.A.

(57) ABSTRACT

Illustrative embodiments provide an efficient, resilient high-availability ("HA") router architecture. In illustrative embodiments, metric and event data is made resilient to node failover by replication. The same data is stored on the database of each router. Instead of pushing metrics directly from all of each node's software to each node's database, replication is instead handled by the database loader application subscribing to queues on both nodes. In some embodiments, records are written in the queues to topics that have a certain time to live (TTL), so the loader on one node has the duration of the TTL to read from the other node's queue in order to achieve replication.

14 Claims, 13 Drawing Sheets

Related U.S. Application Data continuation of application No. 17/104,672, filed on Nov. 25, 2020, now Pat. No. 11,816,095.

(60) Provisional application No. 62/941,162, filed on Nov. 27, 2019.

(51) Int. Cl.
*H04L 41/069* (2022.01)
*H04L 45/44* (2022.01)
*H04L 67/1095* (2022.01)
*H04L 45/00* (2022.01)

(52) U.S. Cl.
CPC .......... *H04L 45/44* (2013.01); *H04L 67/1095* (2013.01); *H04L 45/56* (2013.01)

(56) References Cited

U.S. PATENT DOCUMENTS 10,038,601 B1* 7/2018 Becker .................... H04L 43/12
10,050,933 B2 8/2018 Froelich
10,123,063 B1 11/2018 Brown
10,275,412 B2 4/2019 Ramamurthi
10,411,985 B1 9/2019 Miller et al.
10,509,396 B2* 12/2019 Sandler ............ G05B 19/41835
10,635,986 B2 4/2020 Miyakoshi et al.
10,989,430 B2 4/2021 Kim
11,816,095 B2 11/2023 Fast et al.
12,164,509 B2 12/2024 Fast et al.
2005/0135276 A1* 6/2005 Bouchat .................. H04L 45/48 370/256
2006/0002394 A1* 1/2006 Kuranari ................. H04L 45/60 370/392
2008/0209413 A1 8/2008 Kakumani et al.
2009/0245099 A1* 10/2009 Tsuchiya ................. H04L 45/28 370/221
2014/0226566 A1 8/2014 Soneda et al.
2014/0229504 A1 8/2014 Kim et al.
2015/0341135 A1* 11/2015 Xia ..................... H04J 14/0212 398/83
2016/0042014 A1 2/2016 Jalan et al.
2016/0315871 A1* 10/2016 Kwak ..................... H04L 41/40
2017/0102933 A1 4/2017 Vora et al.
2017/0195169 A1 7/2017 Mills et al.
2017/0357250 A1 12/2017 Sandler et al.
2018/0006943 A1* 1/2018 Dubey .................... H04L 45/44
2018/0234348 A1* 8/2018 Goloubew .............. H04L 43/04
2018/0276266 A1 9/2018 Diwakar
2018/0288146 A1 10/2018 Wang et al.
2019/0014055 A1 1/2019 Gupta et al.
2019/0138559 A1 5/2019 Wang et al.
2019/0146884 A1 5/2019 Gangadharappa et al.
2019/0363865 A1 11/2019 Dong et al.
2020/0134217 A1 4/2020 Vishnyakov et al.
2021/0067429 A1 3/2021 Krochmal
2021/0157796 A1 5/2021 Fast et al.

OTHER PUBLICATIONS

Extended Search Report from counterpart European Application No. 20893977.7 dated Feb. 1, 2023, 8 pp.
First Office Action and Search Report, and translation thereof, from counterpart Chinese Application No. 202080094685.4 dated Jul. 19, 2023, 12 pp.
International Preliminary Report on Patentability from International Application No. PCT/US2020/062144, dated Jun. 9, 2022, 7 pp.
Notice of Intent to Grant, and translation thereof, from counterpart Chinese Application No. 202080094685.4 dated Feb. 1, 2024, 4 pp.
Pignolet et al., "Load-optimal local fast rerouting for resilient networks", IEEE/IFIP International Conference on Dependable Systems and Networks, IEEE, Nov. 22, 2017, 12 pp.
Prosecution History from U.S. Appl. No. 17/104,672, dated May 10, 2022 through Aug. 28, 2023, 89 pp.
Prosecution History from U.S. Appl. No. 18/473,772, dated Oct. 18, 2023 through Nov. 1, 2024, 33 pp.
Notice of Intent to Grant and Text Intended to Grant from counterpart European Application No. 20893977.7 dated Dec. 22, 2025, 57 pp.
Extended European Search Report and Search Opinion received for European Application No. 20893977.7, mailed on Jan. 2, 2023, 8 pages.

* cited by examiner

METRICS AND EVENTS INFRASTRUCTURE

This application is a continuation of U.S. patent application Ser. No. 18/473,772, filed Sep. 25, 2023, which is a continuation of U.S. patent application Ser. No. 17/104,672, filed Nov. 25, 2020, which claims the benefit of U.S. Provisional Application No. 62/941,162, filed Nov. 27, 2019, the entire content of each of which is incorporated herein by reference.

TECHNICAL FIELD

Illustrative embodiments generally relate to network devices and, more particularly, to analytics for routing devices.

BACKGROUND

A router is an apparatus that serves as a communications interface between other systems. It is known to implement a router using a combination of hardware and software. For example, a familiar router is small device that provides a communications connection between a home computer and the homeowner's internet service provider ("ISP"). Some such routers include one or more antennas that allow a user to establish a communications link between the user's computer and the router using a wireless protocol known generally as "Wi-Fi."

SUMMARY

In accordance with one embodiment, a multi-node router system includes a first router node configured to send and receive network data, and to produce first node analytic data. The first node includes a first node database.

The multi-node router system also includes a second router node configured to send and receive the same network data, and to produce second node analytic data. The second router node generally operates on the same network data as the first router, but operates independently of the first router in that, if the first router is not functioning, the second router continues to send and receive network data, and if the second router is not functioning, the first router continues to send and receive network data. The second router node includes a second node database distinct from the first node database.

In addition, the multi-node router system includes a cross-coupling connection by which the first node analytic data is provided to the second node and by which the second node analytic data is provided to the first node. Each router node therefore has both the first node analytic data and the second node analytic data. Each of the first router node and the second router node then creates an analytics image including first node analytic data and the second node analytic data, such that each router node stores an identical analytics image.

To those ends, in some embodiments, the first node further includes a first microprocessor configured to execute a first set of software applications, wherein the first set of software applications, when executed on the first microprocessor configure the first microprocessor to send and receive the network data, and produce the first node analytics data. The first node further includes a first node loader in communication with the first set of software applications, the first node loader configured to communicate the first node analytics data from the first set of software applications to the first node database. In such embodiments, the second node further includes a second microprocessor configured to execute a second set of software applications, wherein the second set of software applications, when executed on the second microprocessor: configure the second microprocessor to send and receive the network data; and produce the second node analytics data. The second node also includes a second node loader distinct from the first node loader, the second node loader in communication with the second set of software applications, the second node loader configured to communicate the second node analytics data from the second set of software applications to the second node database.

In illustrative embodiments, the first node further includes a first node set of queues, each queue in the first node set of queues in data communication with a corresponding software application of the first set of software applications, and in data communication with the first node loader, such that the first node loader is operably coupled between the first node set of queues and the first node database, and the second node further includes a second node set of queues, each queue in the second node set of queues in data communication with a corresponding software application of the second set of software applications, and in data communication with the second node loader, such that the second node loader is operably coupled between the second node set of queues and the second node database.

In some such embodiments, the cross-coupling connection includes (a) a first cross-coupling connection by which the first node loader is in data communication with the second node set of queues on the second node, and the first node loader is configured to communicate the second node analytics data from the second node to the first node database; and (b) a second cross-coupling connection by which the second node loader is in data communication with the first set of queues on the first node, and the second node loader is configured to communicate the first node analytics data from the first node to the second node database.

In some embodiments, the first node database and/or the second node database includes a time-series database.

In some embodiments, the first node set of queues include first pub-sub queues; the second node set of queues include second pub-sub queues; the first node loader subscribes to the first node set of queues; and the second node loader subscribes to the second node set of queues. In illustrative embodiments, the second node set of queues comprise pub-sub queues, and the first node loader subscribes to the second node set of queues and the second node loader subscribes to the second node set of queues.

In some embodiments, the first node set of queues is configured to receive analytics data from at least one software application of the first set of software applications, and is configured to hold that analytics data for a limited time to live.

Any of the foregoing embodiments may also include a housing, wherein the first node and the second node are both within the housing.

Any of the foregoing embodiments may also include a joint network interface, wherein the first node and the second node are both configured to send and receive the network data to and from an external network through the joint network interface.

Another embodiment discloses a method of operating a multi-node router apparatus. The method includes providing a first node apparatus configured to send and receive network traffic, and to produce first node analytics data. That first node apparatus includes a first database and a first loader.

The method also includes providing a second node apparatus separate from the first node apparatus. The second node apparatus is configured to send and receive the network traffic, and to produce second node analytics data. The second node apparatus includes a second database distinct from the first database, and a second loader distinct from the first loader.

The method also includes operating the multi-node router apparatus to send and receive the network traffic, and providing the first node analytics data to the first loader.

The method also includes receiving, at the first loader from the second node, the second node analytics data, and building a first analytics image in the first database by contemporaneously: writing the first node analytics data from the first loader to the first database, and writing the second node analytics data from the first loader to the first database, the first node analytics data and the second node analytics data forming the first analytics image.

In some embodiments, wherein the first node apparatus further includes a first set of queues and the second node apparatus further comprises a second set of queues, the method also includes providing the first node analytics data to the first loader comprises providing the first node analytics data to the first set of queues, and subsequently providing the first node analytics data from the first set of queues to the first loader.

In some embodiments, the method includes providing the first node analytics data to the second loader, and building a second analytics image in the second database by contemporaneously: writing the first node analytics data from the second loader to the second database, and writing the second node analytics data from the second loader to the second database, the first node analytics data and the second node analytics data forming the second analytics image in the second database.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DETAILED DESCRIPTION

Figure 1:
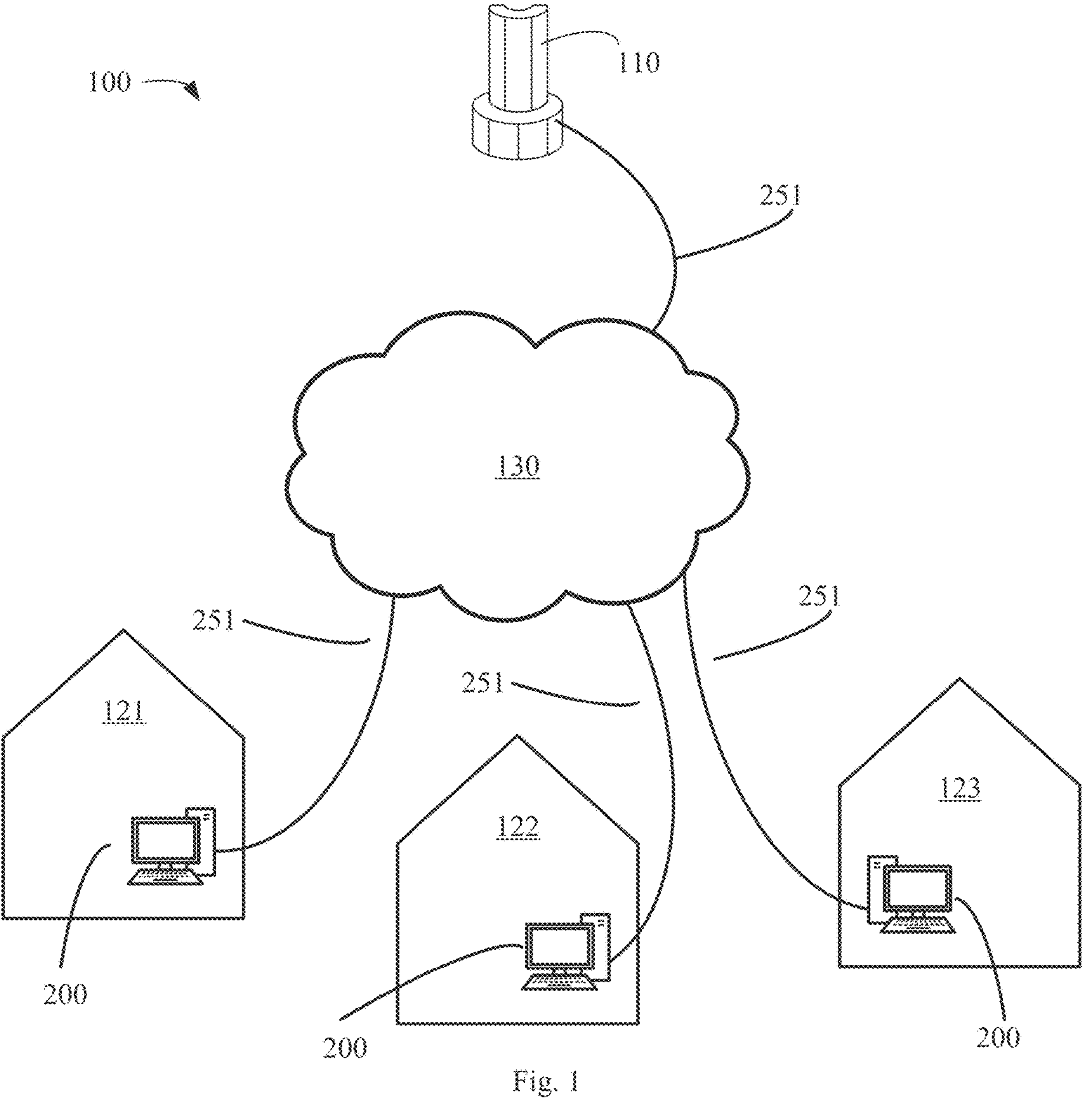
FIG. 1 schematically illustrates a network including an embodiment of a dual-node router.

Illustrative embodiments provide an efficient, high-availability ("HA") router architecture with improved fault tolerance, and/or improved availability, as compared to prior art routers.

In a multi-node (e.g., two or more nodes) router, each router node is implemented in part by router software executing on a corresponding instance of node hardware. The router software may include one or more applications (which may be referred-to as "router apps"). In addition to implementing the communications function of the router, router software generate analytics data.

In illustrative embodiments, metric and event data is made resilient to node failover by replication. The same data is stored on the database of each router node of the multi-node router. Instead of pushing metrics directly from all of each node's software to each node's database, replication is instead handled by the database loader application subscribing to queues on each node of the multi-node router. In illustrative embodiments, records of analytics data are written in the queues to topics that have a certain time to live (TTL), after which the records are no longer maintained by or available from the queues, so the loader app on one node has the duration of the TTL to read from the other node's queue in order to achieve replication. Although unexpected, this allows replication to tolerate partitions between the two nodes in the router's high-availability node pair.

Definitions: the following terms have the following meanings in this specification.

The term "analytic data" (or "analytics data") means data produced by a router and relating to the operation of the router, and may include data relating to or describing an event ("event data") and/or data comprising a metric ("metric data"). Analytic data is distinct from network data.

A "counter" is a monotonically increasing metric.

An "event" is an action relating to a system. Some events are "administrative" events (or "audit" events) that relate to administration of a system, and include a user login, a change of a user's password, a change of system configuration, to name but a few examples. Some events are system events, such as a change of the system's time, for example. Some events are alarm events, such as failure of a system's interface.

A "metric" is an integer measurement in a router. The term "metric" includes both a "counter" and a "meter." An example of a metric is the number of packets processed by a router.

A "meter" is a metric that can increase and decrease.

The term "network traffic" (or "network traffic data") refers to data conveyed (i.e., received and/or sent) by a router. Network data includes, for example, data sent by a router across a network to which the router is coupled.

A "pub-sub queue" is a service (e.g., implemented by executable code) that provides a data structure configured to receive data published by one or more publishers, and configured to selectively provide a subset of such data to a subscriber. The subset of data provided by the pub-sub queue to a subscriber is determined by the subscriber, and may include all, or only some, of the published data. Some embodiments store published data for a limited time, which limited time may be referred-to as the data's "time to live" ("TTL").

A "set" comprises at least one member. For example, a set of software routers comprise at least one software router.

A "shared network interface" is a network interface through which a plurality of router nodes communicate with a single network.

A "traffic event," with regard to a router, is an event that describes a routing or network action taken by the router.

The term "TSDB" means "time series database."

Time series data are typically stored as dense high-precision data points that are then downsampled and aged out. To this end, TSDBs may offer features of rollups and TTLs. In addition, TSDBs usually provide features for generating sequences of aggregated values over time. The inventors have found that a time series database is desirable for use in systems with a write-heavy workload. When used to store time-ordered data, some embodiments of a time series database take advantage of the time ordered nature of the data to compress the data and reduce storage (e.g., disk or solid-state drive) footprint. Time series databases can be either SQL (relational) or NoSQL (non-relational) in architecture. NoSQL databases may better operate at scale in a cluster and focus features on just time series data at the sacrifice of ACID guarantees.

FIG. 1 schematically illustrates an environment 100 including several premises 121, 122, 123, each having an embodiment of a multi-node (e.g., dual-node) router 200. Any of premises 121, 122, 123 may be a home or a business location.

Each dual-node router 200 couples one of the respective premises to a server 110 via the network 130. For example, in illustrative embodiments, each of the premises 121, 122, 123 is a retail outlet of a given company, and the server 110 is a computer at the headquarters of the given company, to which computers each of the premises 121, 122, 123 report.

Figure 2A:
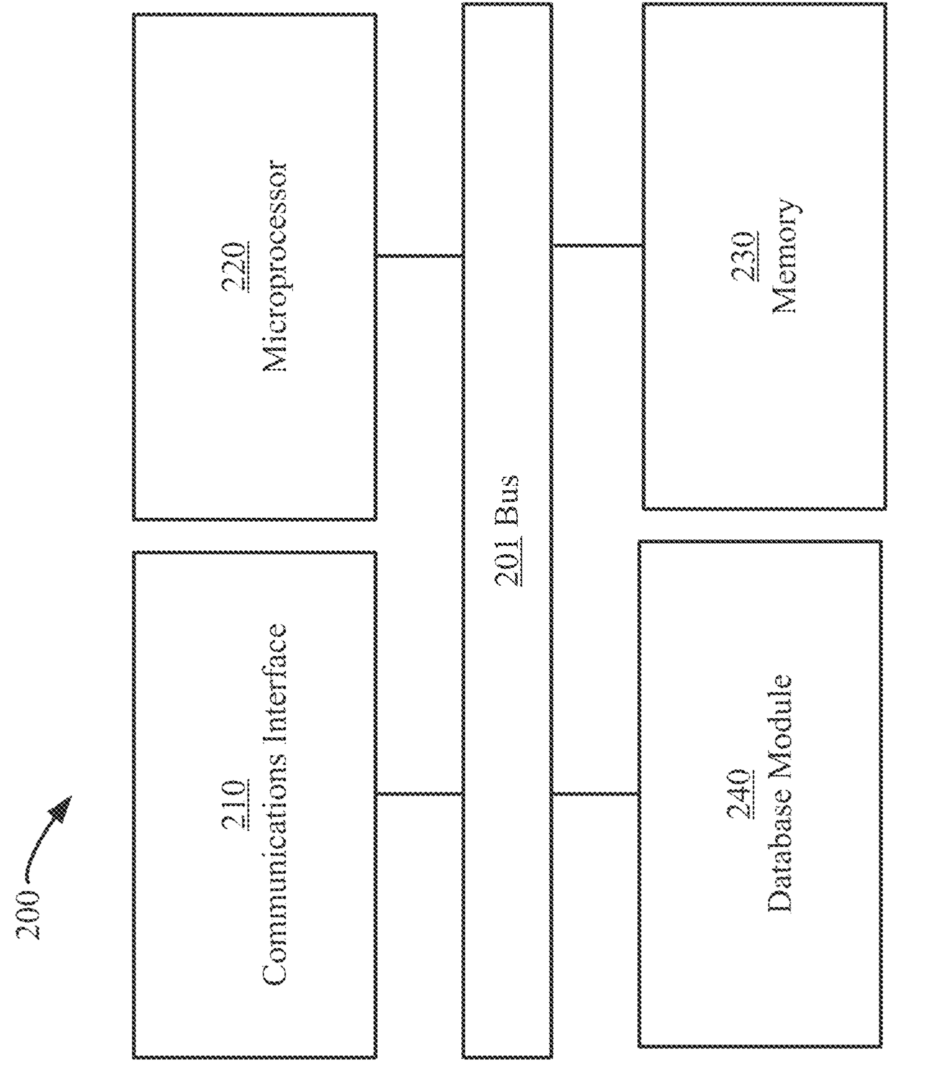
FIG. 2A schematically illustrates an embodiment of a router node.

FIG. 2A schematically illustrates an embodiment of router hardware 200. Any of the router nodes described herein may be implemented on such router hardware 200. The router hardware includes several modules in communication with one another over the bus 201. The router hardware includes a microprocessor 220 and a digital memory 230. The microprocessor 220 may be a semiconductor microprocessor as known in the electronics arts, such a microprocessor from Intel Corporation, Advanced Micro Devices, Inc., or a microprocessor fabricated as part of an application-specific integrated circuit, such as a microprocessor implemented pursuant to a core available from ARM Limited, to name but a few examples.

The digital memory 230 may be a volatile memory (e.g., RAM), but is preferably non-volatile memory. In any case, the digital memory 230 is configured to store, among other things, instructions which, when executed by the microprocessor 220, cause the microprocessor 220 to perform one or more of the functions described herein.

The database module 240 is a memory that may be a hard drive or solid-state drive, or which may be implemented in the digital memory 230.

The router hardware 200 also include a communications interface 210 configured to operably couple the hardware 200 to other devices, including other routers or computers, over a communications channel such as network 130. In illustrative embodiments, the communications channel 130 may be a dedicated communications line, an intranet, or the Internet, to name but a few examples. In some embodiments, a respective communications interface of each of two or more routers 310, 320 may couple to a network 130 via a shared network interface 302.

Figure 2B:
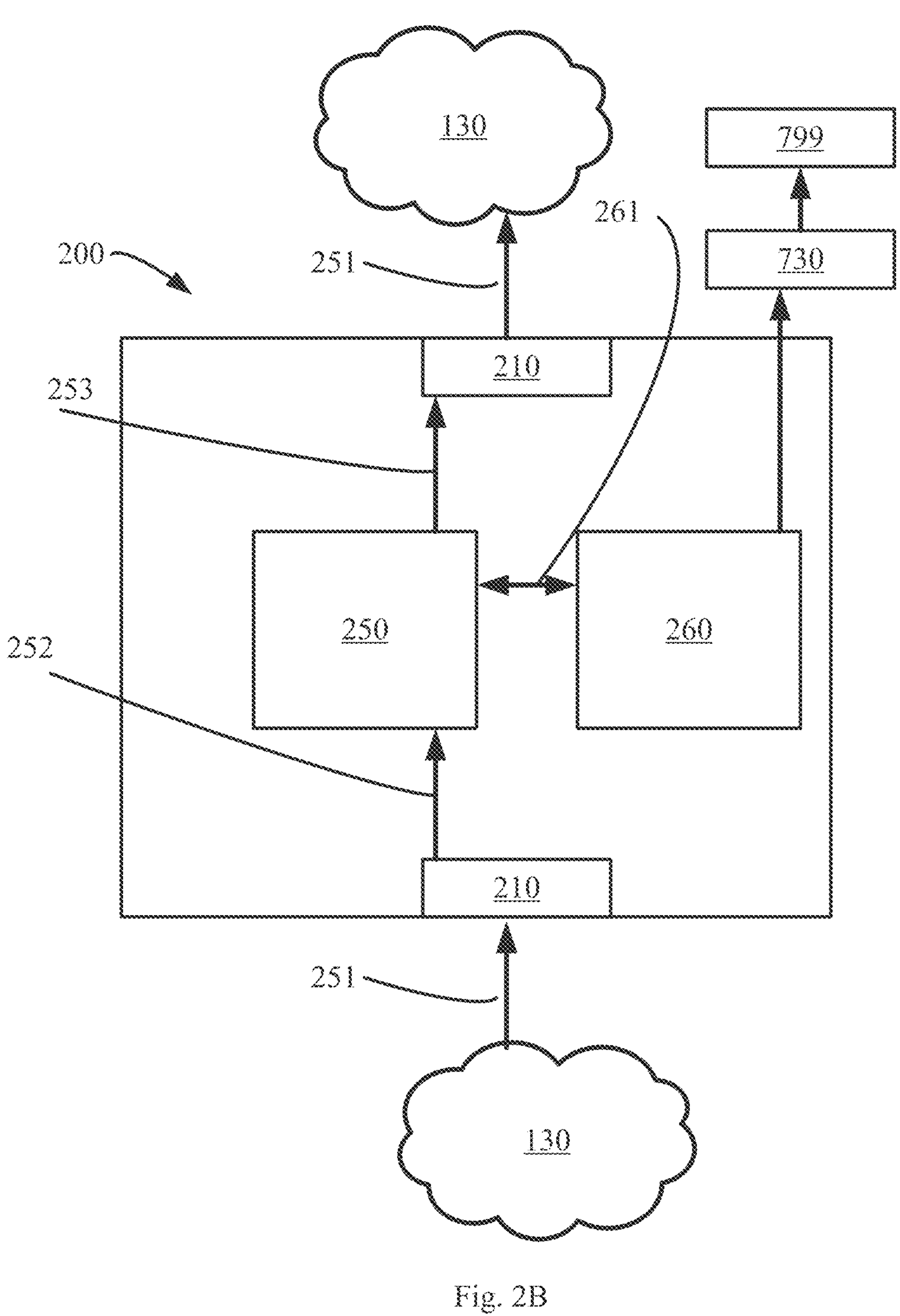
FIG. 2B schematically illustrates an embodiment of a router node.

FIG. 2B schematically illustrates a router 200 in an operational environment. In this embodiment, the communications interface 210 of the router 200 is coupled to the network 130 to send and receive network data 251 pursuant to routing functionality 250. More specifically, the router 200 receives incoming network data (received data) 252 from a data source on the network 130, and transmits outgoing network data (transmitted data) 253 to a data destination via the network 130, all pursuant to routing functionality 250 as known in the router and data network arts. Typically, the data source is a computer in communication with the network 130 or router 200, and the data destination is another computer in communication with the network 130 or router 200. The routing functionality may be implemented according to one or more router apps 311 described below.

The router 200 also has analytic data generation functionality 260. Generally, each router app 311 executing on the router 200 generates analytic data 261, which analytic data 261 is distinct from the network data 251. That analytic data 261 is captured and processed as described below. The analytic data 261 in some embodiment is provided to a centralized analysis system 799 via a conductor 730, as described further below.

Illustrative embodiments described herein are described based on router technology available at least from 128 Technology. Metrics and events are the primitive sources of data. As such, metrics and events are the inputs to router analytics that help describe, predict, and prescribe router and network behavior.

In illustrative embodiments, metric and event-based features store (identical copies of) data on each router node. Efficiently and performantly storing and querying data significantly depends on the type of data, and both events and metrics are common in that they are time series data. Beyond ordering by timestamp, time series data is almost always recorded as new records, and commonly is made useful by aggregating values over time.

Embodiments of the metrics and events infrastructure involves the systems that collect and serve up metrics and events. Such an infrastructure brings functional value while also remaining both performant and resilient in the distributed and resource-constrained environments in which some routers are deployed.

The metrics and events infrastructure in illustrative embodiments enables collection and storage of router analytics data useful for monitoring routers (e.g., 128 Technology routers) in a network. For example, engineers may use analytics data for debugging, testing and analytics-based business logic; sales engineers and network administrators may use analytics for monitoring, troubleshooting, and configuration decision guidance; and sales and marketing personnel may use analytics for price reporting as well as demonstrating competitive features of the product.

A high density of near real time data can serve monitoring needs, while downsampled data can be queried to help operators perform historical analysis.

A Router Node

Figure 3A:
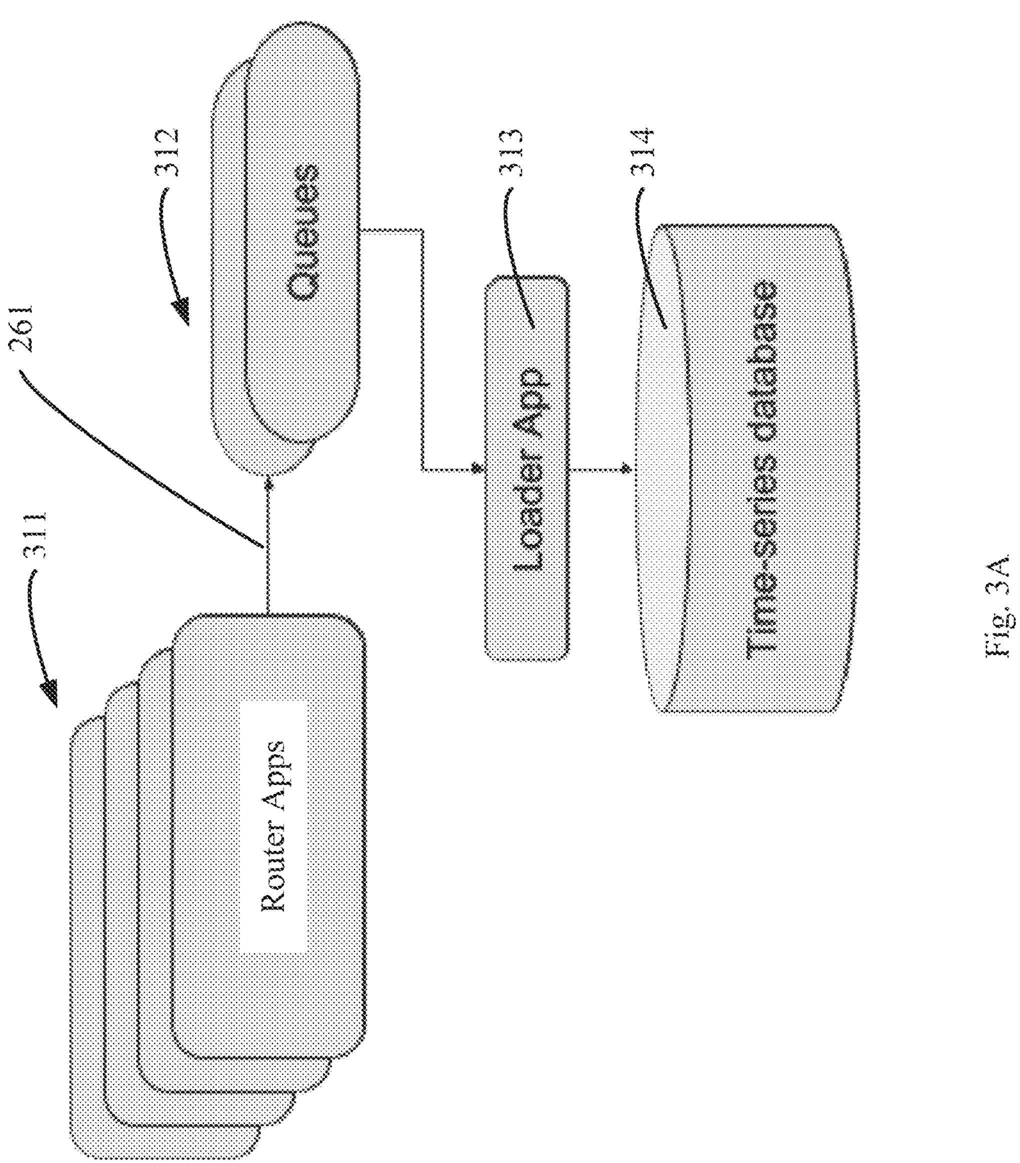
FIG. 3A schematically illustrates an embodiment of one node of a dual-node router.

FIG. 3A schematically illustrates an embodiment of a router node 310. The router node 310 may be implemented by executing a set of router apps 311 on an instance of router hardware 200, for example.

Router Apps

A "router app" (or "Application") 311 is an item of code that is executable on a microprocessor 220. A set of router apps 311 are configured, collectively, to implement a router on an instance of router hardware 200.

A router app 311 that is necessary to implement the communication functionality (or "routing" functionality) of a router 310 may be referred to as an "essential" router app. An example of an essential router app 311 is an application that is configured to forward packets from the router 310 across a network 130.

Some router apps 311 may be desirable within a router, but may not be necessary to implement the communication functionality of the router 310. Such a router app may be referred to as a "non-essential" router app 311. An example of a non-essential router app d311 is an application that coordinates queries to a database 314. In illustrative embodiment, the database 314 and database 324 are each a time series database, such as the InfluxDB available from InfluxData Inc.

Examples of other router apps 311 include an app that coordinates the activity of a plurality of router nodes (e.g., 310; 320); and an API that manages a graphical user interface ("GUI").

Queues

The router 310 includes a set of one or more analytic data queues 312. In illustrative embodiments, each analytic data queue 312 in the set of queues 312 may receive from one or more router apps 311, and hold (e.g., indefinitely, or for a limited "time to live"), metric data or event data on a specific topic.

Figure 4:
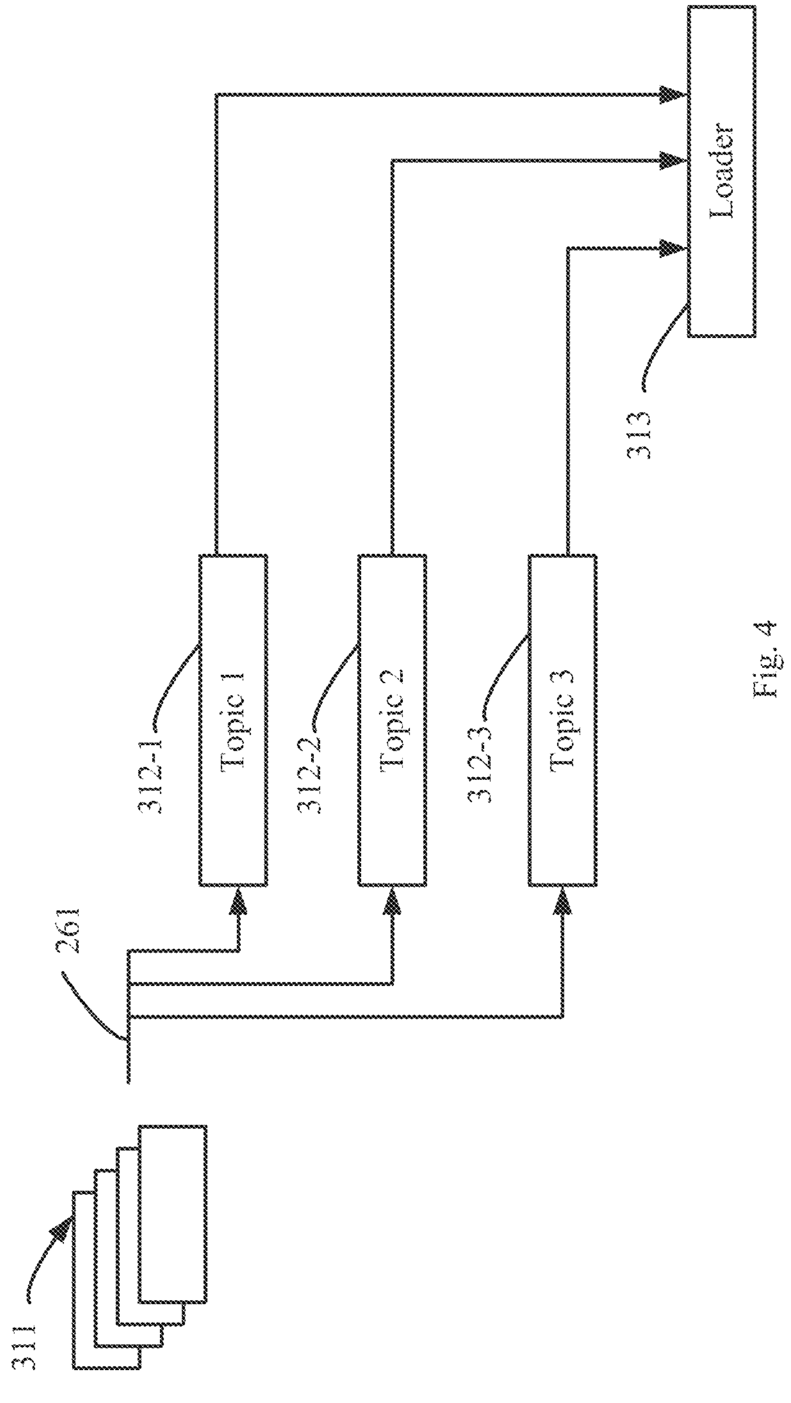
FIG. 4 schematically illustrates an embodiment of a set of queues.

FIG. 4 schematically illustrates a set of several analytic data queues 312-1, 312-2 and 312-3. Each queue is operably coupled to one or more of the router apps 311 to receive, from one or more of the router apps, analytics data including metric data and/or event data. In illustrative embodiments, each queue 312-1, 312-2 and 312-3 stores not only the analytics data, but also holds a time associated with each datum of that data. For example, each datum of events data may be associated with the time at which the event occurred. As another example, each item (or "datum") of metrics data may be associated with a time or time period to which the metrics data relates. Some embodiments tag one or more items of analytic data with a source tag that records the router 310, node, or the router app 311, that generated such item of analytics data. The inventors have found that such tagging aids the process of ensuring that data from one node (for example, node 310) has not been missed by the other node (for example, node 320), and simplifies the process of such other node (320) retrieving the missing data directly from the database (in this example, database 314) of such said one node, as could happen for example if data in a queue (for example, a queue 312) has timed-out or expired at the end of its time-to-live. Illustrative embodiments tag all such analytics data.

In illustrative embodiments, such source tags remain associated with the item of analytics data and, in illustrative embodiments, are processed along with the item of analytics data as described herein (e.g., stored in a database; provided to a central analysis system, etc.).

In an illustrative embodiment, queue 312-1 may be a metrics queue configured to receive and store metrics data from one or more of the router apps 311; queue 312-2 may be an event queue configured to receive and store data pertaining to or describing a given event or type of event; and queue 312-3 may be an offline-events queue configured to receive and store data pertaining to or describing a given event or type of event that occurred while a router 310 is not running. For example, if a router 310 is implemented on a system 200 that executes (or runs under) an operating system, the operating system may be active, including generating events, at time when the router 310 is not being executed. Such events may be stored in the offline-events queue 312-3.

In illustrative embodiments, one or more of the queues 312 is a "pub-sub queue," and one or more of the router apps 311 is a publisher that provides event data and/or metric data to one or more queue 312.

In illustrative embodiments, one or more of the queues 312 holds its data (e.g., metrics; events) only for a limited "time to live" ("TTL"). For example, a time to live may be specified or measured in minutes; hours; days; weeks; months; or years, and may be determined by a systems designer or system operator, depending on need and available resources.

Loader

Each queue in the set of queues 312 (e.g., queues 312-1, 312-2 and 312-3) is operably coupled to the loader 313 and is configured to provide its content (e.g., metrics data; events data) to the loader 313. In illustrative embodiments, the loader 313 pulls data from one or more of the queues 312-1, 312-2 and 312-3, and writes that data to the database 314. Stated alternately, the loader 313 controllably receives analytics data from a from one or more of the queues 312, and subsequently writes that data to the router node's database 314.

In illustrative embodiments, in which at least some of the queues in the set of queues 312 are configured as a pub-sub queue, the loader 313 is configured as a subscriber, and receives from the queues 312 the data to which it subscribes. A loader 313 may subscribe to all, or a subset of, data in the set of queues 312.

Database

The events data and metrics data acquired by the loader 313 is provided by the loader 313 to the database 314, and is stored on the database 314.

In illustrative embodiments, each datum of analytics data is associated with a time, and the database 314 holds both the analytics datum and the time associated with that datum.

For example, for a datum of events data, the database 314 holds the associated time at which the event occurred, in a manner by which the datum and the time are associated. As another example, for a datum of metrics data, the database holds the time or time period to which the metrics data relates, in a manner by which the datum and the time are associated.

In some embodiments, the database 314 may include, for each datum provided by the loader 313, two associated records: a first record for the datum, and a second, associated record, for the time associated with the datum. In some embodiments, the database 314 is a time-series database, as known in the database arts.

Figure 5A:
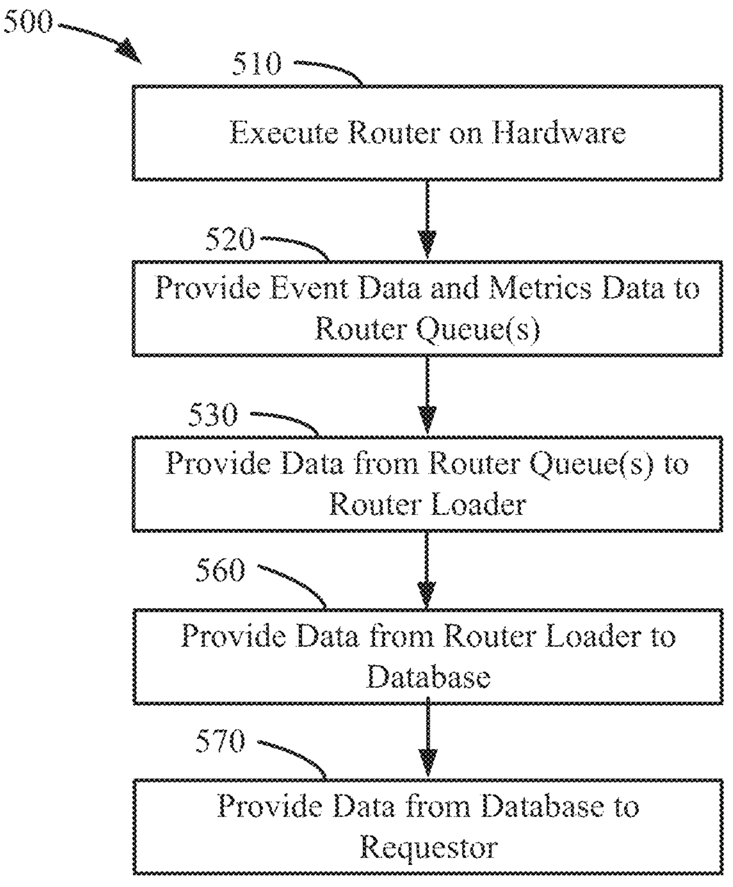
FIG. 5A is a flow chart illustrating operation of a router.

FIG. 5A is a flow chart that illustrates a method 500 of operation of a single router node 310. At step 510, the router node 310 executes a set of router applications 311, e.g., on microprocessor 220. Operation of the router node 310 may include receiving and/or processing and/or transmitting network data 251.

Each application 311 in the set of applications provides metrics and/or events data to a set of one or more queues 312 (e.g., 312-1; 312-2; and/or 312-3) of that router node 310, at step 520.

At step 530, each of the one or more queues 312 provides its metrics and/or events data to the loader 313 of the router node 310. The loader 313 is configured to act as an interface between the set of queues 312 and the database 314 of the router node 310. To that end, the loader 313 of the router node 310 is in operable communication with the database 314. In a dual-node router 300, the loader 313 of the first router node 310 is also in operable communication with the set of queues 322 of the second router node 320.

The loader 313 then provides that data to the database 314 of the router node 310, at step 560. As such, the router builds, in its database 314, an analytics image, which analytics image includes the first node analytics data and, as described below, the second node analytics data.

When the router node 310 receives a request for data (for example, from a conductor 730, as described below), the router node 310 provides the requested data from the database 314 to that requestor, at step 570.

Figure 3B:
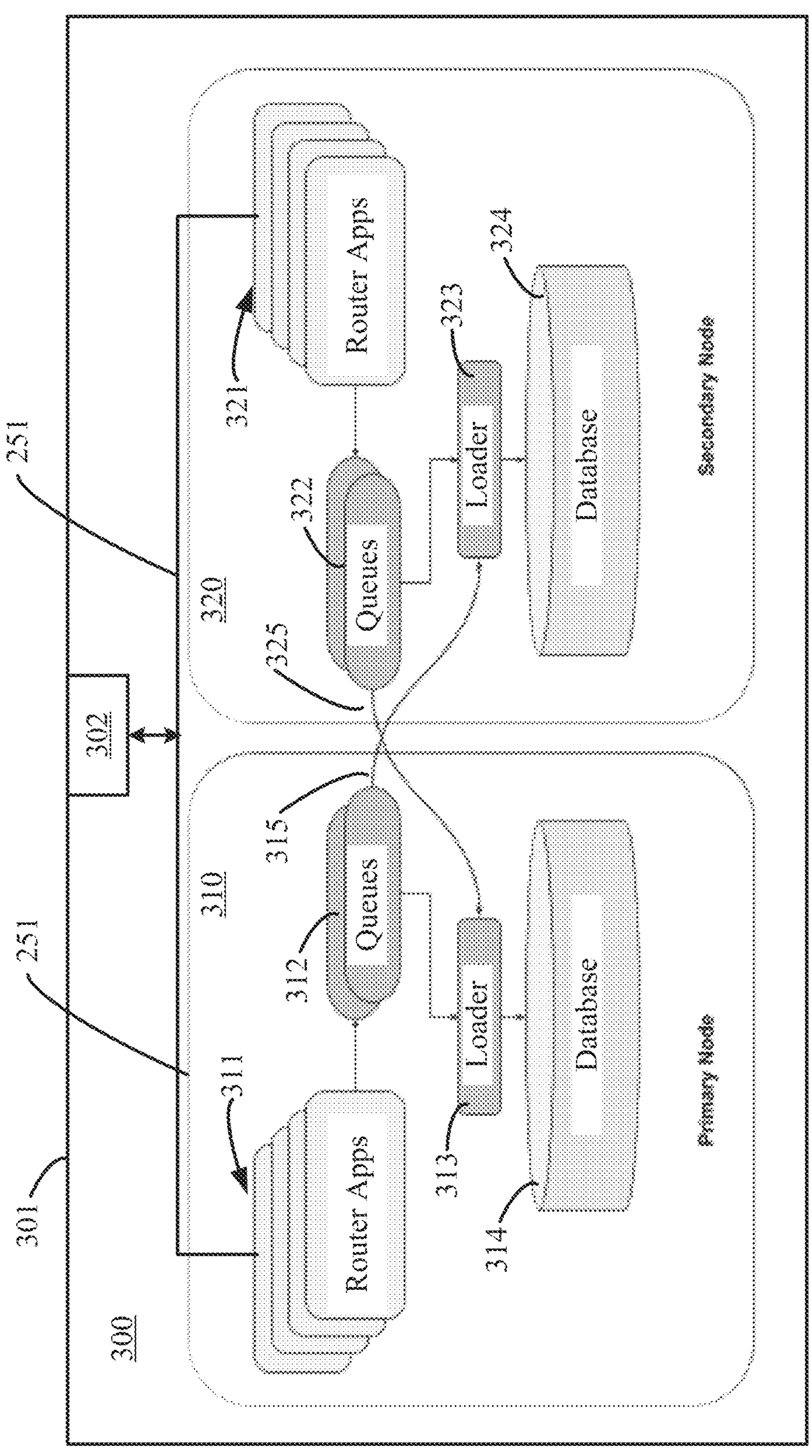
FIG. 3B schematically illustrates an embodiment of a dual-node router.

FIG. 3B schematically illustrates a multi-node router system 300. In this illustrative embodiment, the multi-node router system 300 includes two nodes 310, 320 (which may be referred-to as the "primary node" and the "secondary node," respectively, or alternatively the "first node" and "second node"), and so may be referred-to as a "two-node" router or a "dual-node" router, but other embodiments may have more than two nodes. Each of the two nodes 310, 320 is a router as schematically illustrated in FIG. 3A and described above, for example.

In illustrative embodiments of a dual-node router 300, the router nodes 310, 320 execute on separate and distinct instances of router hardware 200. In other words, router 310 is executed on a first instance of router hardware 200, and router 320 is executed on a second, distinct instance of router hardware 200. Moreover, in illustrative embodiments, the instances of router hardware 200 are physically distal from one another, at least in that they do not share the same housing, although they are interconnected as by cross-coupling connection 315 and 325. Moreover, in some embodiments, each instance of router node 310 includes a connection to a power source, and/or a connection to the network 130, that is separate and distinct from the connection to a power source and connection to the network 130 of a second router node 320.

Other embodiments of the dual-node router 300, however, include a housing 301, which housing contains (e.g., encloses) the hardware (e.g., instances of hardware 200) of the dual-node router 300 (e.g., router nodes 310; 320) and the hardware of the dual-node router 300 is contained within the housing 301.

Figure 5B:
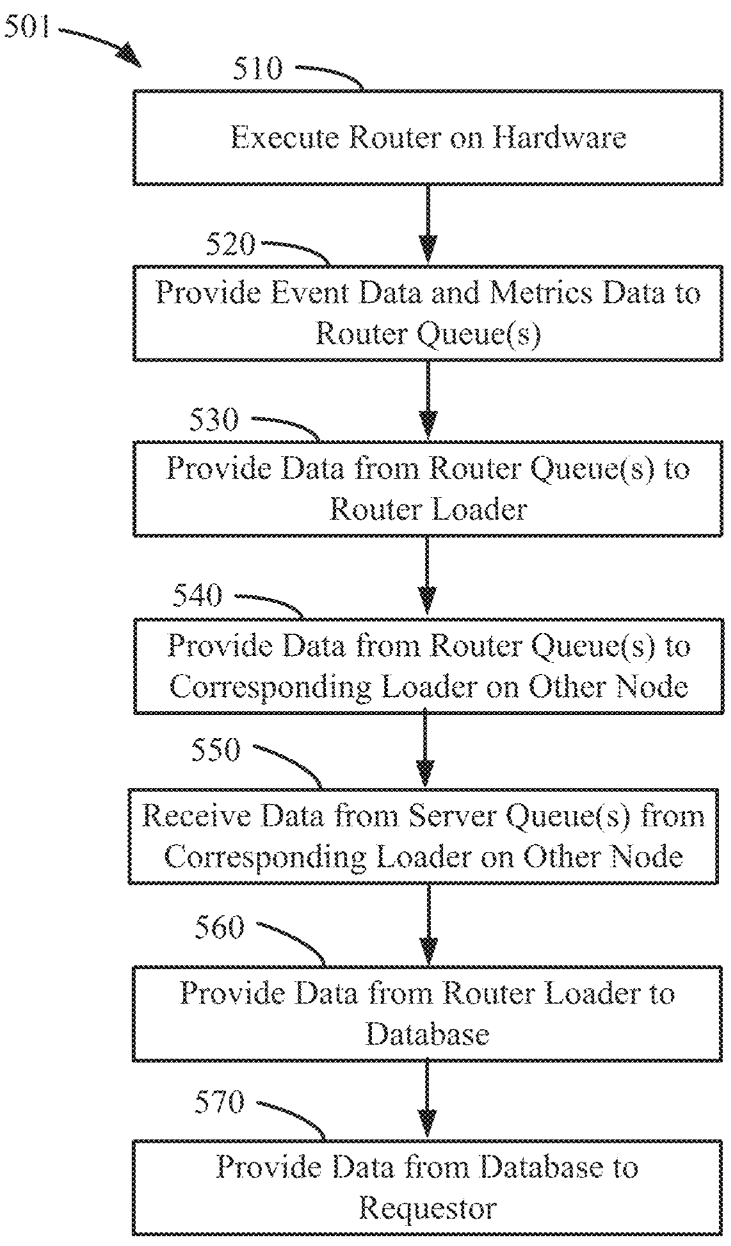
FIG. 5B is a flow chart illustrating operation of a router in a router pair.

FIG. 5B is a flow chart that illustrates a method 501 operation of a dual router 300, having two router nodes 310, 320. In illustrative embodiments, the router nodes 310 and 320 are identical.

Each router node 310, 320 executes steps 510, 520, and 530 as described in connection with FIG. 5A.

At step 540 and step 550, the queue of one or each of the router nodes 310, 320 (i.e., queue 312 and queue 322, respectively) provides its metrics and/or events data to the loader of the other node (320, 310; i.e., loader 323 and loader 313, respectively).

At step 560, each loader 313, 323 provides its data to its corresponding database (314, 324, respectively). It should be noted that the data provided by each loader 313, 323 of each router node 310, 320 may include data from its own queues (312, 322, respectively) as well as data from the queue (322, 312, respectively) of the other node (320, 310, respectively).

In this way, the dual-node router 300 assures that each database 314, 324 receive and stores analytics data (an "analytics image") that includes analytics data from both nodes, and preferably contains and stores identical data. In this way, if one node (310, 320) fails or goes off-line, the other node (320, 310) may carry on with sending and/or receiving network traffic, so that the dual-node router 300 operates seamlessly to send and/or receive network traffic.

At step 570, each node supplies data from its database (314, 324, respectively) to a requestor.

Figure 6A:
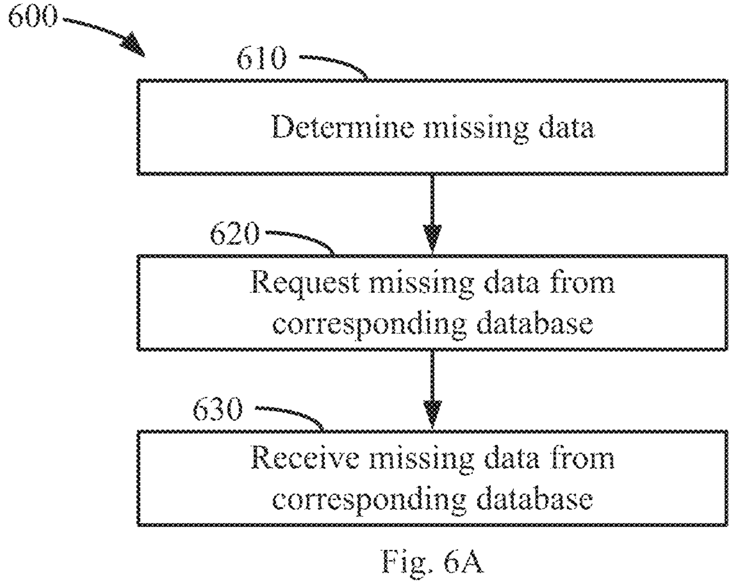
FIG. 6A is a flow chart illustrating a method of acquiring missed data.

FIG. 6A is a flow chart that illustrates a method 600 by which a router in a dual router system 300 can acquire data that it failed to acquire from its own queue or from a corresponding queue in an associate router. One router may be a first router 310 and the other router may be second router 320. For purposes of the illustration, the following example uses router 310 as the first router (or "requesting" router), and uses router 320 as the second router (or "responding" router).

It may be desirable for the router node 310 to acquire such missed data, for example, if the loader 313 of the router node 310 failed to acquire a set of data from the queue 312 of the router node 320. Such a scenario might occur, for example, if the time-to-live of the data in a queue in the first set of queues 312 expires before the loader 313 is able to acquire that data, or if the communication link between the loader 313 and queue 312 is inoperable or otherwise unavailable, for example due to a faulty connection or power outage.

At step 610, a first router 310 determines that its database 314 is missing data. For example, the first router 310 may audit the content of the database 314 and realize that the database 314 does not contain data from a certain period of time.

Consequently, at step 620 the first router node 310 sends, to the second router node 320, a request for the missing data. In illustrative embodiments, the database 324 of the second router 320 (which may be referred-to as the "second" database) includes a copy of the missing data.

Subsequently, at step 630, the first router 310 receives, from the second router 320, a copy of the missing data. In illustrative embodiments, the second router 320, and specifically the second database 324 of that router, retains its copy of the missing data. In this way, the first database 314 on the first router node 310 contains a complete analytics image.

Figure 6B:
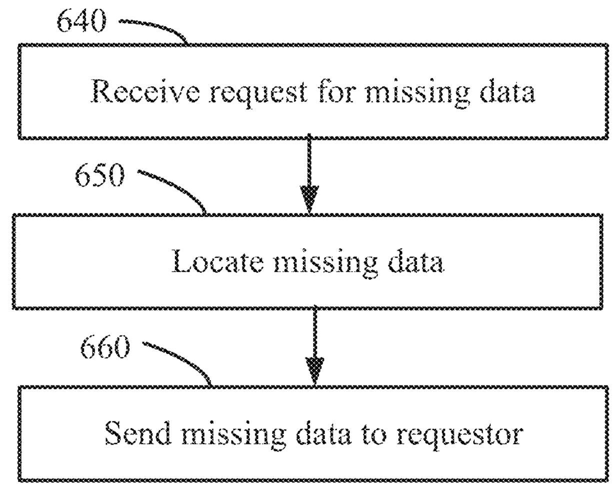
FIG. 6B is a flow chart illustrating a method of providing missed data.

The operation of the second router 320 in the foregoing scenario is illustrated in FIG. 6B. At step 640, the second router node 320 receives the request for missing data from the first router node 310. At step 650, the second router 320 locates its copy of the missing data (i.e., the "requested" data) in the second database 324. Subsequently, at step 660, the second router 320 sends the requested data to the first router 310.

Without limiting the generality of the disclosure of the foregoing description and figures, a method of operating a multi-node router apparatus includes providing a first node apparatus configured to operate as a first router. The first node apparatus includes a first set of queues, a first loader, and a first database. In operation, that includes producing first node analytics data.

The method also includes providing a second node apparatus distinct from the first node apparatus. The second node apparatus includes a second set of queues, a second loader, and a second database. In operation the second node apparatus produces second node analytics data distinct from the first node analytics data.

The method includes operating the multi-node router apparatus to send and receive network data traffic, which network traffic is distinct from the first node analytics data and the second node analytics data.

In operating the multi-node router 300, the method includes providing the first node analytics data to a first set of queues 312, and subsequently providing the first node analytics data from the first set of queues 312 to the first loader 313. In illustrative embodiments, the act of providing the first node analytics data to the first loader 313 includes providing the first node analytics data to a first queue, the first queue associated with the first node apparatus 310, and subsequently providing the first node analytics data from the first queue to the first loader 313.

The method also includes receiving, at the first loader 313 from the second node 320, the second node analytics data. For example, the second set of queues 322 may provide the second node analytics data to the first loader 313, in addition to providing that second node analytics data to the second loader 323.

The first node analytics data and the second node analytics data are then used to build a first analytics image in the first database 314 by contemporaneously writing the first node analytics data from the first loader 313 to the first database 314; and writing the second node analytics data from the first loader 313 to the first database 314, the first node analytics data and the second node analytics data forming the first analytics image.

Illustrative embodiments of the methods also include providing the first node analytics data to the second loader 323 (e.g., from the first set of queues 312); and building a second analytics image in the second database 324 by contemporaneously writing the first node analytics data from the second loader 323 to the second database 324; and writing the second node analytics data from the second loader 323 to the second database 324, the first node analytics data and the second node analytics data forming the second analytics image in the second database 324.

As can be seen from the foregoing disclosure, a dual-node router 300 according to various embodiments is more robust than a single-node router, and is even more robust than two routers running in parallel, because each router node 310, 320 in the dual-node router 300 independently and dynamically populates its respective database 314, 324 so that each database stores an identical analytics image of metrics and/or event data. As such, the dual-node router 300 provides its own redundancy. In addition, each node 310, 320 has the ability to populate its database 314, 324 from its counterpart database 324, 314, thereby improving the reliability of the dual-node router 300. As just one example, a given node 310, 320 may retrieve data from its counterpart database 324, 314 in the event that the node 310, 320 failed to obtain data from its own queue 312, 322 before the time-to-live of that data expired.

A Conductor

Figure 7A:
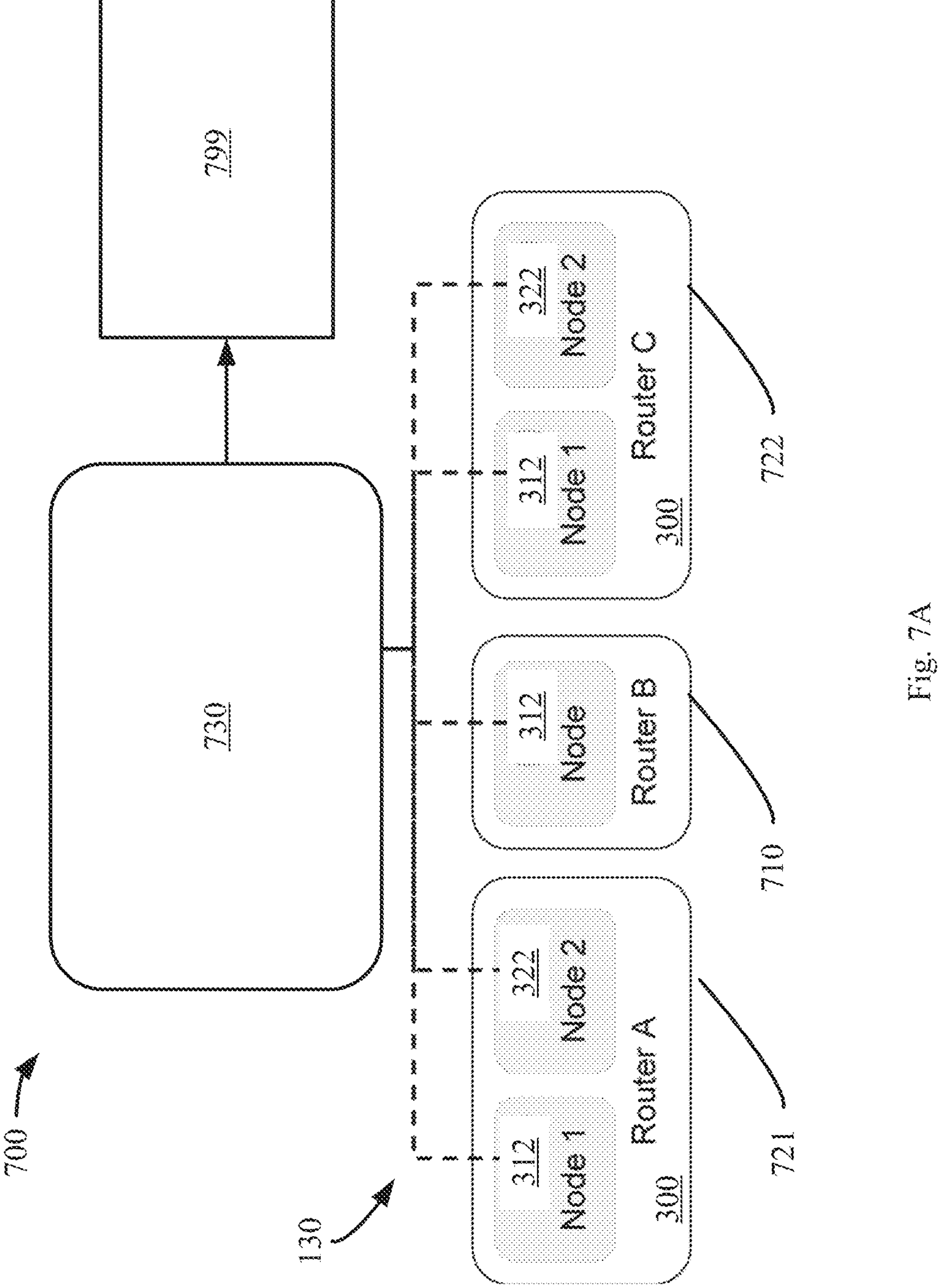
FIG. 7A schematically illustrates an embodiment of a network having a conductor and a centralized analysis system.

Some network systems include a plurality of routers, some or all of which may be single-node routers, and some or all of which may be multi-node routers 300. An illustrative network 700 with at one single-node router 710 and two dual-node routers 721, 722 (e.g., each a dual-node router 300) is schematically illustrated in FIG. 7A.

In operation, the routers (e.g., 710; 721; 722) in a network 700 rapidly produce great quantities of router analytics data. Such analytics data may be analyzed to monitor the health and operation of the network 700 and its routers (710; 721; 722). As noted, it should be understood that the router analytics data is distinct from the network traffic that passes through a router.

In some embodiments, it is preferable that such analysis is not performed on the routers themselves, however, not only because that would require analytics data from a plurality of routers to be centralized on one of the routers for analysis, but also because such analysis (of one router's data, or the data of a plurality of routers) would consume the processing resources of such a router and risk compromising the ability of such a router to perform its primary function (i.e., transmitting and receiving network traffic data) and/or its data storage function (e.g., as described above).

Consequently, such data analysis is preferably performed by one or more centralized or common analysis systems 799. That also presents challenges, however, since the time or times when a router is available to send analytics data to a centralized analysis system 799 may depend on the quantity of network traffic being processed by the router. As such, the time when a router is available (e.g., has some spare capacity) to send analytics data to a centralized analysis system 799 may not be known a priori, may not be predicable; may not be consistent over time; and may be sporadic. Moreover, even when a router is available to send analytics data to a centralized analysis system 799, the router's available bandwidth, and/or the bandwidth of a network or communication link on which the router sends the analytics data to a centralized analysis system 799, may be impaired or otherwise less than ideal or even nominal or specified.

Consequently, centralized analysis system 799 may not be able to retrieve or receive such analytics data from the routers 710, 721, 722 at times and/or bandwidths that are is convenient to, or available for, the centralized analysis system 799.

To mitigate some or all of those issues, the network 700 also includes a conductor 730 having a conductor database. In illustrative embodiments, the conductor 730 is a dedicated circuit configured to coordinate the reception of analytic data from a plurality of routers, and provide that analytic data to a centralized analysis system 799 in a timely and orderly way.

To that end, the conductor 730 is configured to act as, and in operation does act as, an intermediary between the routers 710, 721, 722 and the analysis system 799. As described below, routers 710; 721; 722 transmit their analytics data to the conductor 730, and the conductor 730 stores that analytics data in its conductor database (733; 743). Embodiments of such an architecture and method provide one or more benefits.

- For example, one such benefit is enabling the capping and control of bandwidth consumption used for monitoring the routers of the network.
- In addition, metrics and events, and particularly alarms, are made available for inspection even from a router or router node that has crashed, or is otherwise operating in a degraded state.
- Also, retrieval (by an analysis system 799) of such metrics and events from a conductor 730, as opposed to from each individual router (710, 721, 722) avoids a fan-in/fan-out set of requests to, and responses from, each individual router. Moreover, retrieval (by an analysis system 799) of such metrics and events from a conductor 730, as opposed to from each individual router (710, 721, 722) avoids retrieving the same data twice for multiple queries of the same metrics of similar time windows.

Moreover, as compared to direct communication between the routers.

(710, 721, 722) and the centralized analysis system 799, the conductor 730 (and the network 700 employing the conductor 730) is more tolerant to network partitions in retrieving alarms and/or events to which the conductor 730 subscribes, because the alarms and/or events persist in the set of pub-sub queues 734 of the conductor 730 for a time-to-live (TTL), so the conductor 730 has that TTL duration to connect and retrieve analytics data from each router node (710, 721, 722) and/or to send such analytics data to the centralized analysis system 799.

Figure 7B:
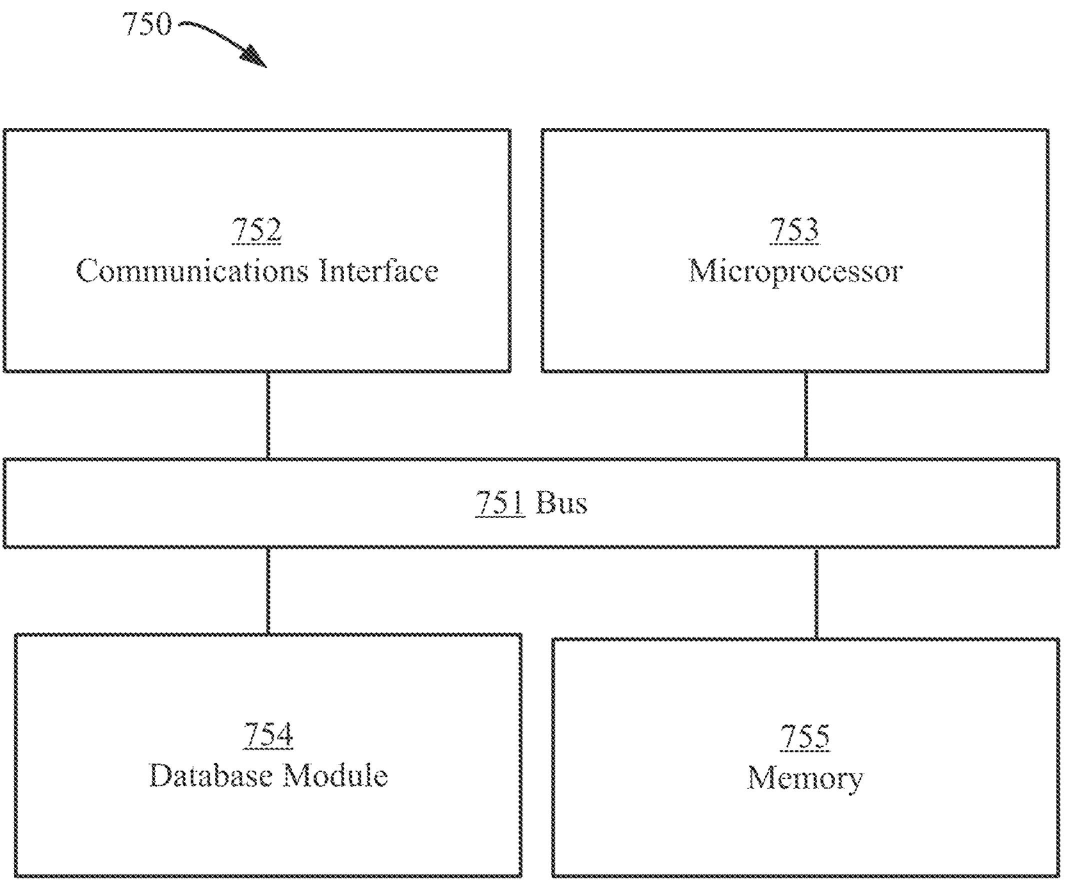
FIG. 7B schematically illustrates an embodiment of a conductor node.

An embodiment of conductor node hardware 750 is schematically illustrated in FIG. 7B. Any of the conductor nodes (e.g., node 731; node 732) described herein may be implemented on such conductor node hardware 750. The conductor node hardware 750 includes several modules in communication with one another over the bus 751. The conductor node hardware 750 includes a microprocessor 753 and a digital memory 755. The microprocessor 753 may be a semiconductor microprocessor as known in the electronics arts, such a microprocessor from Intel Corporation, Advanced Micro Devices, Inc., or a microprocessor fabricated as part of an application-specific integrated circuit, such as a microprocessor implemented pursuant to a core available from ARM Limited, to name but a few examples.

The digital memory 755 may be a volatile memory (e.g., RAM), but is preferably non-volatile memory, and is configured to store, among other things, instructions which, when executed by the microprocessor 753, cause the microprocessor 753 to perform one or more of the functions of the conductor as described herein.

The database module 754 is a memory that may be a hard drive or solid-state drive, or which may be implemented in the digital memory 755.

The conductor node hardware 750 also includes a communications interface 752 configured to operably couple the hardware 750 to other devices, including one or more routers (e.g., 710; 721; 722) or computers, as well as a centralized analysis system 799, over a communications channel such as network 130.

Figure 7C:
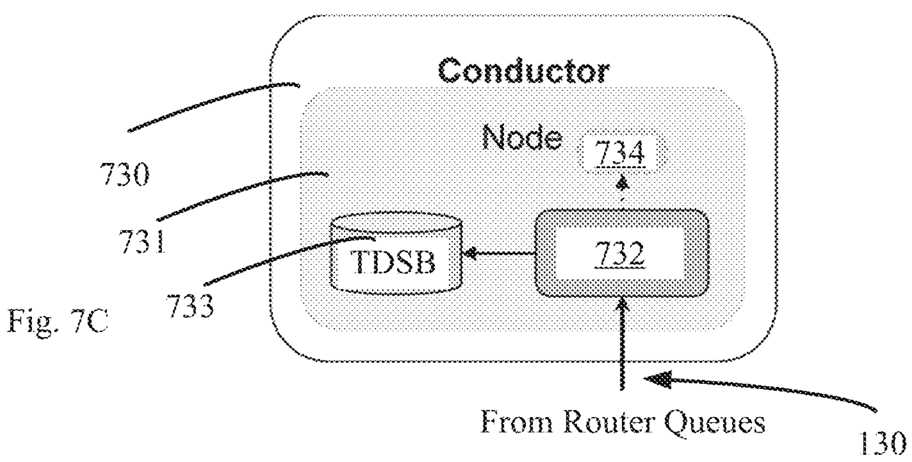
FIG. 7C schematically illustrates an embodiment of a single-node conductor.

FIG. 7C schematically illustrates an embodiment of a single-node conductor 730.

The conductor 730 includes a conductor node 731 having consumer app 732, which may be thought of as a consumer of analytic data produced by routers 710, 721, 722 in the network 700.

The consumer app 732 is coupled in communication to database (e.g., a time-series database) 733, and to a set of one or more queues 734. The consumer app 732 is also coupled in communication with a set of routers, e.g., 710, 721 and 722. More specifically, in illustrative embodiments the consumer app 732 subscribes to one or more router topics from a corresponding set of one or more pub-sub queues 312, 322 in the node 731 of a router, which topics contain a subset of analytics data processed by the central analysis system 799.

The consumer app 732 then stores those metrics and events in the conductor's database (e.g., time-series database 733).

In operation, the centralized analysis system 799 may request some or all of such metrics and events data from the conductor 730. For example, in some embodiments the centralized analysis system 799 is a subscriber that subscribes to the set of pub-sub queues 734 of the conductor 730. To that end, the consumer app 732 may provide some or all of the analytics data, received from the routers 721, 721, 722, to the set of queues 734, or may retrieve some or all of analytics data from the conductor database 733 and then provide that retrieved analytics data to the set of queues 734. The set of queues 734 are operably coupled (e.g., through a communications interface 752) to the analysis system 799 (e.g., over network 130).

Figure 7D:
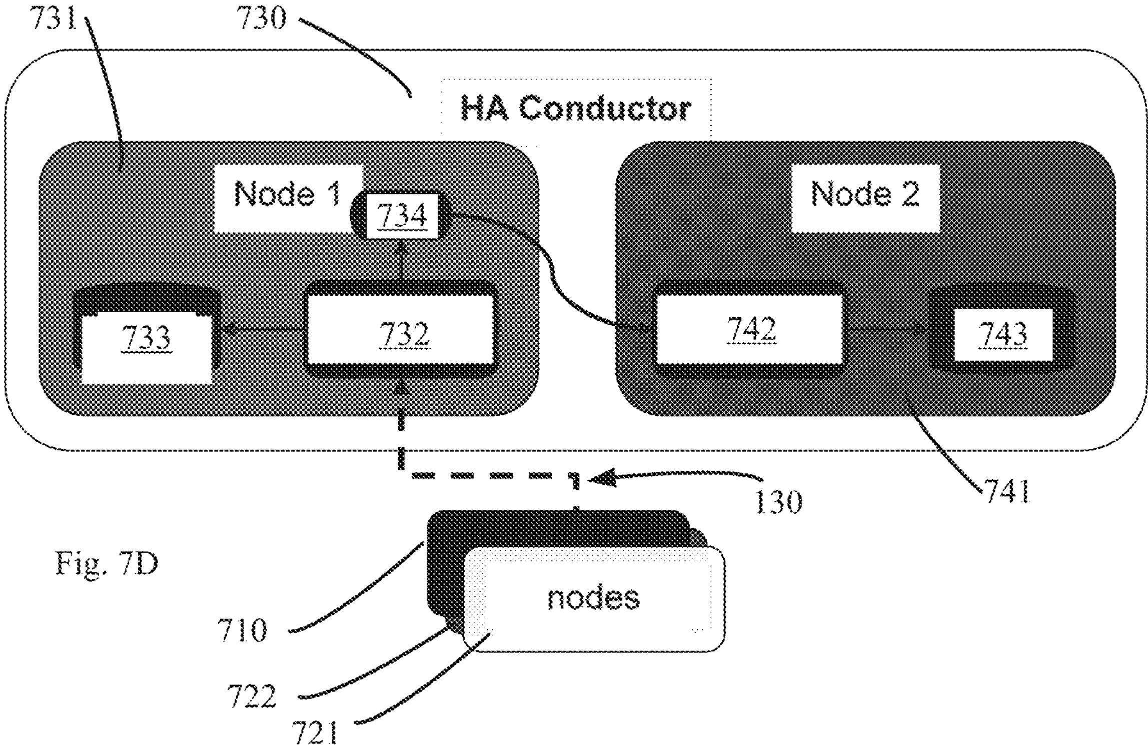
FIG. 7D schematically illustrates an embodiment of a dual-node conductor.

FIG. 7D schematically illustrates an embodiment of a dual-node conductor, which may be referred-to as a "high availability" or "HA" conductor. This embodiment of a conductor 730 has two conductor nodes: first conductor node 731 as described in connection with FIG. 7B, and a second conductor node 741. The dual-node conductor 730 is more robust than a single-node conductor because the second node acts as backup for the first node. As such, when the first node is unavailable, for example due to node failure, or when the first node is offline for maintenance or upgrade, the second node is configured to, and does, take over and execute the same operations (sending and receiving network traffic, and producing analytics data) as the first node, so that the operation of the conductor 730 is continuous even when the first node is unavailable.

To those ends, the second conductor node 741 includes a second conductor consumer app 742 communicatively coupled to a second conductor database 743. In the embodiment of FIG. 7C, the consumer app 732 of the first consumer node 731 is also coupled in communication with a set of routers, e.g., 710, 721 and 722, but the second consumer app 742 of the second consumer node 741 is not coupled in communication with those routers 710, 721 and 722. Rather, the second consumer app 742 of the second consumer node 741 is coupled in communication with the set of queues 734 of the first consumer node 731, and subscribes to analytics data from that set of queues 734 of the first consumer node 731. The second consumer app 742 is in data communication with a second consumer database 743, and may store in the second consumer database 743 the data that it receives from the set of queues 734 of the first consumer node 731.

Accordingly, it can be understood from the foregoing descriptions that the conductor 730 is more than merely a conduit for metrics and events data from routers 710, 721, 722 to the centralized analysis system 799. Rather, the conductor 730 also acts to coordinate communication of metrics and events data from routers 710, 721, 722 to the centralized analysis system 799. For example, the conductor 730 retrieves and receives metrics and events data from a plurality of routers 710, 721, 722 at times when those routers are able to send such metrics and events data, even if the centralized analysis system 799 is not ready or available to receive such centralized analysis system 799. Then, after storing the metrics and events data, the controller 730 provides some or all of the metrics and events data to the centralized analysis system 799 at a times when the centralized analysis system 799 is available to retrieve and receive that data, even if the routers 710, 721, 722 are not at that time available to send such data. Consequently, in coordinating in time the operations of the routers 710, 721, 722 and the centralized analysis system 799, the conductor 730 may be described as somewhat like the conductor of an orchestra.

Figure 8:
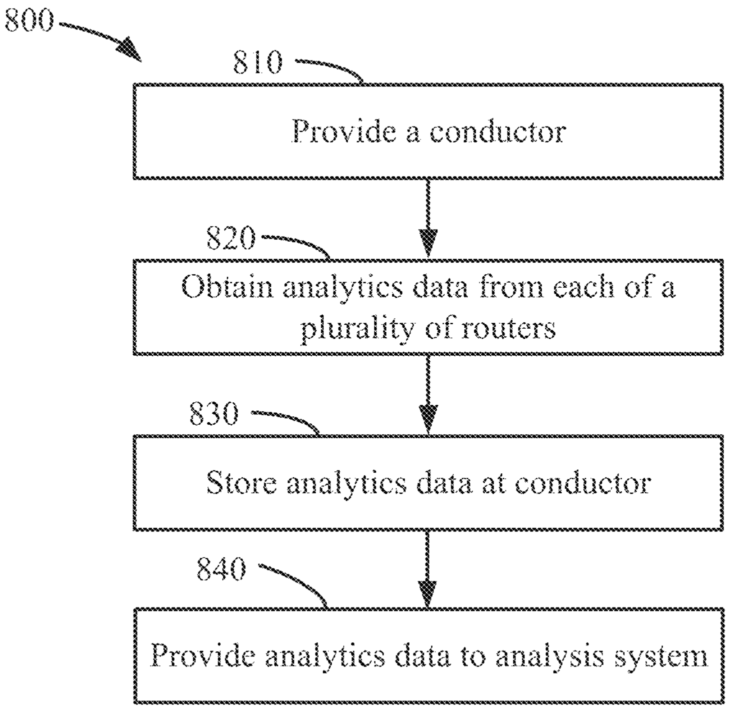
FIG. 8 is a flowchart illustrating an embodiment of operation of an embodiment of a conductor.

FIG. 8 is a flowchart illustrating an embodiment of method 800 of operation of an embodiment of a conductor.

Step 810 includes providing a conductor (730, according to any of the embodiments described above) in operable communication with a plurality of routers, each router of the plurality of router nodes comprising a set of router nodes. For example, the plurality of routers may include one or more single-node routers 710, and/or one or more multi-node routers (721; 722).

Step 820 includes obtaining at the conductor 730 at a first time, from each router of the plurality of routers, analytics data. Such analytics data may be referred-to as "acquired analytics data." To that end, the conductor 730 is operably coupled to (i.e., is in operable communication with) each router of the plurality of routers and obtains analytics data via such coupling. In some embodiments, the conductor 730 is operably coupled to a database (314; 324) of each such router, and obtains analytics data from each such router by drawing such analytics data from the respective databases. In some embodiments, the conductor 730 is operably coupled to a loader (313; 323) of each such router, and obtains analytics data directly from the respective loaders. In some embodiments, the conductor 730 is operably coupled to a set of queues 312 of each such router. In such embodiments in which the queues 312 comprise a set of pub-sub queues, the conductor 730 subscribes to said pub-sub queues and obtains analytics data via such subscriptions.

Step 830 includes storing, at the conductor 730, the acquired analytics data. Such stored data may be referred-to as "buffered analytics data"). Some embodiments store the buffered analytics data in the controller queue. Some embodiments store the buffered analytics data in a controller database (733; 743). Some embodiments store the buffered analytics data in a controller database (733; 743), and subsequently provided to a controller queue 734 for later provision to a centralized analysis system 799.

Step 840 includes providing the buffered analytics data to a centralized analysis system 799 at a second time subsequent to the first time. Some embodiments of step 840 include providing, to the controller queue 734, buffered analytics data from a plurality of routers; and coupling the controller queue 734 to the centralized analysis system 799; and then providing the buffered analytics data from a plurality of routers to the centralized analysis system 799 from the controller queue 734.

In some embodiments, obtaining the analytics data (acquired analytics data) includes obtaining the analytics data at a first rate; and providing the buffered analytics data to the centralized analysis system 799 includes providing the buffered analytics data at a second data rate that is different than the first data rate. For example, the conductor 730 may extract analytics data from the router at rates and or at times at which each such router is able to provide its analytics data. Such rates and/or times may be rates and times at which the conductor 730 is not capable of receiving such analytics data. In some embodiments, the second data rate is slower than the first data rate.

In some embodiments, the controller queue 734 includes a pub-sub queue, and the centralized analysis system 799 subscribes to topics on the controller queue 734 according to a subscription. In such embodiments, providing, to the centralized analysis system 799, the buffered analytics data includes sending the buffered analytics data to the centralized analysis system 799 according to the subscription.

The following is a list of reference numbers used herein.

100: Environment;
110: Server;
121: First premises;
122: Second premises;
123: Third premises;
130: Network;
200: Router hardware;
201: Bus;
210: Communications interface;
220: Microprocessor;
230: Memory;
240: Database module;
250: Routing functionality;
251: Network data;
252: Received network data;
253: Transmitted network data;
260: Analytic data functionality;
261: Analytic data;
300: Dual-node router;
301: Housing;
302: Network interface;
310: First node;
311: First set of router applications;
312: First set of queues;
312-1: Topic 1 queue;
312-2: Topic 2 queue;
312-3: Topic 3 queue;
313: First loader application;
314: First database;
315: First cross-couple connection;
320: Second node;
321: Second set of router applications;
322: Second set of queues;
323: Second loader application;
324: Second database;
325: Second cross-couple connection;
700: Network of routers, controller and analysis system;
730: Controller;
731: First controller node;
732: Consumer app;
733: First controller database;
734: Controller queue set;
741: Second controller node;
743: Second controller database;
750: Conductor hardware;
751: Conductor bus;
752: Conductor communications interface;
753: Conductor microprocessor;
754: Conductor database;
755: Conductor memory;
799: Analysis system.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A conductor apparatus configured to conduct analytic data produced by a plurality of routers from said routers to a central analytics analysis system, the apparatus comprising:

a communication interface configured to couple to an analytic data queue in each router of the plurality of routers, and configured to couple to the central analytics analysis system; and a conductor queue in data communication with the communication interface to:

(a) receive analytic data from the analytic data queue in each router of the plurality of routers; and (b) convey said analytic data to the central analytics analysis system.

P2: The conductor apparatus of P1, wherein the apparatus further comprises a database coupled to the communications interface to receive and store analytic data received from each router of the plurality of routers.

P3: The conductor apparatus of P2, wherein the database coupled to the communications interface to convey said analytic data to the central analytics analysis system.

P4: The conductor apparatus of any of P1-P3, wherein the communication interface and the conductor queue are configured to receive analytic data from the analytic data queue in each router of the plurality of routers at a first time and to convey said analytic data to the central analytics analysis system at a second time, the second time delayed from the first time.

P5: The conductor apparatus of any of P1-P4, wherein the communication interface and the conductor queue are configured to receive analytic data from the analytic data queue in each router of the plurality of routers at a first data rate, and to convey said analytic data to the central analytics analysis system at a second data rate, the second data rate different from the first data rate.

P11: A method of gathering router analytics data to a centralized analytics processor, comprising:

providing (810) a conductor (730, according to any of the embodiments described above) in operable communication with a plurality of routers, the conductor each router of the plurality of routers comprising a set of router nodes;

obtaining at the conductor at a first time, from each router of the plurality of routers, analytics data (acquired analytics data) (820);

storing, at the conductor, the acquired analytics data buffered analytics data (830);

providing (840), to a centralized analysis system (799) at a second time subsequent to the first time, the buffered analytics data.

P12: The method of P11, wherein the conductor comprises a database, and storing the acquired analytics data at the conductor comprises storing the buffered analytics data in the database.

P13: The method of P11, wherein the conductor comprises a controller queue (734), and providing (840) the buffered analytics data to the centralized analysis system (799) comprises:

providing, to the controller queue (734), buffered analytics data from a plurality of routers; and coupling the controller queue (734) to the centralized analysis system (799); and providing the buffered analytics data from a plurality of routers to the centralized analysis system (799) from the controller queue (734).

P14: The method of any of P11-P13, wherein:

obtaining the analytics data (acquired analytics data) comprises obtaining the analytics data at a first rate; and providing the buffered analytics data to the centralized analysis system (799) comprises providing the buffered analytics data at a second data rate that is different than the first data rate.

P15: The method of P14, wherein the second rate is slower than the first rate.

P16: The method of any of P11-P15, wherein:

the controller queue comprises a pub-sub queue;

the centralized analysis system (799) subscribes to topics on the controller queue according to a subscription; and providing (840), to the centralized analysis system (799), the buffered analytics data comprises sending the buffered analytics data to the centralized analysis system (799) according to the subscription.

P21. A method of operating a multi-node router apparatus, the method comprising:

providing a multi-node router apparatus comprising:

a first node apparatus configured to send and receive network traffic, and to produce first node analytics data and to tag items of such first node analytics data with a first node tag identifying the first node as the source of such item of first node analytics data, the first node apparatus comprising a first database and a first loader; and a second node apparatus separate from the first node apparatus, the second node apparatus configured to send and receive the network traffic, and to produce second node analytics data and to tag items of such second node analytics data with a second node tag identifying the second node as the source of such item of second node analytics data, the second node apparatus comprising a second database distinct from the first database, and a second loader distinct from the first loader;

operating the multi-node router apparatus to send and receive the network traffic;

providing the first node analytics data, including corresponding first node tags, to the first loader;

receiving, at the first loader from the second node, the second node analytics data, including corresponding second node tags;

building a first analytics image in the first database by contemporaneously:

writing the first node analytics data and corresponding first node tags from the first loader to the first database; and writing the second node analytics data including corresponding second node tags from the first loader to the first database, the first node analytics data and the corresponding first node tags and the second node analytics data and the corresponding second node tags forming the first analytics image.

P22. The method according to P21, further comprising:

providing the first node analytics data and the corresponding first node tags to the second loader;

building a second analytics image in the second database by contemporaneously:

writing the first node analytics data and the corresponding first node tags from the second loader to the second database; and writing the second node analytics data and the corresponding first node tags from the second loader to the second database, the first node analytics data and the corresponding first node tags and the second node analytics data and the corresponding second node tags forming the second analytics image in the second database.

P23. The method according to any of P21-P22 wherein tagging items of first node analytics data with a first node tag comprises tagging all items of first node analytics data with a first node tag.

P24. The method according to any of P21-P23 wherein tagging items of second node analytics data with a second node tag comprises tagging all items of second node analytics data with a second node tag.

Various embodiments of the foregoing inventions may be implemented at least in part in any conventional computer programming language. For example, some embodiments may be implemented in a procedural programming language (e.g., "C"), or in an object-oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system comprising:

a shared network interface; and processing circuitry in communication with storage media, the processing circuitry configured to execute a second router node of a routing system;

wherein, prior to a failure of a first router node of the routing system, and based on a configuration of the first router node to receive network traffic and send the network traffic to a device with the shared network interface, and the second router node is configured to receive the network traffic with the shared network interface without sending the network traffic, wherein the second router node is further configured to receive, from the first router node, first analytics data related to a first routing operation of the first router node while the first router node is configured to receive the network traffic and send the network traffic to the device, wherein the second router node is further configured to build an analytics image based at least in part on the first analytics data and second analytics data related to a second routing operation of the second router node, and wherein, based at least in part on a failure of the first router node, the second router node is further configured to send, based on the analytics image, the network traffic to the device with the shared network interface to provide high availability for the routing system.

2. The system of claim 1, wherein the analytics image comprises a second analytics image, and wherein the second analytics image is the same as a first analytics image built by the first router node from the first analytics data and the second analytics data.

3. The system of claim 1, wherein the second router node is configured to send the second analytics data to the first router node via a cross-coupling connection of the routing system.

4. The system of claim 1, wherein the second router node is configured to receive the first analytics data from the first router node via a cross-coupling connection of the routing system.

5. The system of claim 1, wherein each item of the first analytics data comprises a first source tag specifying a first router application of a plurality of first router applications executed by the first router node that generated the item.

6. The system of claim 1, wherein the first analytics data comprises first analytics data queues corresponding to a plurality of first router applications executed by the first router node, each of the first analytics data queues storing metric data or event data for a corresponding first router application of the plurality of first router applications.

7. The system of claim 1, wherein the processing circuitry is further configured to execute the first router node of the routing system, and wherein the system further comprises a housing configured to house the shared network interface, the processing circuitry, the first router node, and the second router node.

8. A method comprising:

prior to a failure of a first router node of a routing system and based on the first router node receiving network traffic and sending the network traffic to a device with a shared network interface, receiving, by a second router node of the routing system, the network traffic with the shared network interface without sending the network traffic, wherein the first router node and the second router node are executed by processing circuitry;

receiving, by the second router node and from the first router node, first analytics data related to a first routing operation of the first router node while the first router node is receiving the network traffic and sending the network traffic to the device;

building, by the second router node, an analytics image based at least in part on the first analytics data and second analytics data related to a second routing operation of the second router node; and based at least in part on a failure of the first router node, sending, by the second router node and based on the analytics image, the network traffic to the device with the shared network interface to provide high availability for the routing system.

9. The method of claim 8, wherein the analytics image comprises a second analytics image, and wherein the second analytics image is the same as a first analytics image built by the first router node from the first analytics data and the second analytics data.

10. The method of claim 8, further comprising sending, by the second router node, the second analytics data to the first router node via a cross-coupling connection of the routing system.

11. The method of claim 8, further comprising receiving, by the second router node, the first analytics data from the first router node via a cross-coupling connection of the routing system.

12. The method of claim 8, wherein each item of the first analytics data comprises a first source tag specifying a first router application of a plurality of first router applications executed by the first router node that generated the item.

13. The method of claim 8, wherein the first analytics data comprises first analytics data queues corresponding to a plurality of first router applications executed by the first router node, each of the first analytics data queues storing metric data or event data for a corresponding first router application of the plurality of first router applications.

14. Non-transitory, computer-readable media comprising instructions that, when executed, are configured to cause processing circuitry to:

execute a second router node of a routing system, wherein, prior to a failure of a first router node of the routing system and based on a configuration of the first router node to receive network traffic and send the network traffic to a device with the shared network interface, the second router node is configured to receive the network traffic with the shared network interface without sending the network traffic, wherein the second router node is further configured to receive, from the first router node, first analytics data related to a first routing operation of the first router node while the first router node is configured to receive the network traffic and send the network traffic to the device, wherein the second router node is further configured to build an analytics image based at least in part on the first analytics data and second analytics data related to a second routing operation of the second router node, and wherein, based at least in part on a failure of the first router node, the second router node is further configured to send, based on the analytics image, the network traffic to the device with the shared network interface to provide high availability for the routing system.

* * * * *